United States Patent [19]

Johnson

[11] 3,976,090
[45] Aug. 24, 1976

[54] SLOW START HYDRAULIC VALVE
[76] Inventor: Philip C. Johnson, 5519 Firethorn Court, Cincinnati, Ohio 45216
[22] Filed: Feb. 25, 1975
[21] Appl. No.: 553,046

[52] U.S. Cl. ............................. 137/117; 417/299; 91/468
[51] Int. Cl.² ............... F16K 31/36; F16K 11/00; G05D 11/03
[58] Field of Search ............... 137/115, 117, 116.3, 137/116.5; 417/299; 91/468

[56] References Cited
UNITED STATES PATENTS

| | | | |
|---|---|---|---|
| 2,861,585 | 11/1958 | Becker | 137/115 |
| 3,403,601 | 10/1968 | Eddy | 137/117 X |
| 3,777,773 | 12/1973 | Tolbert | 137/117 |

Primary Examiner—William R. Cline

[57] ABSTRACT

The valve has an input end through which hydraulic fluid is introduced and a main output end through which the hydraulic fluid is transmitted to the mechanism which is controlled. Intermediate the input and output ends is a bypass through which the hydraulic fluid can flow back to the sump which flow occurs until a movable piston within the device closes off the bypass.

2 Claims, 1 Drawing Figure

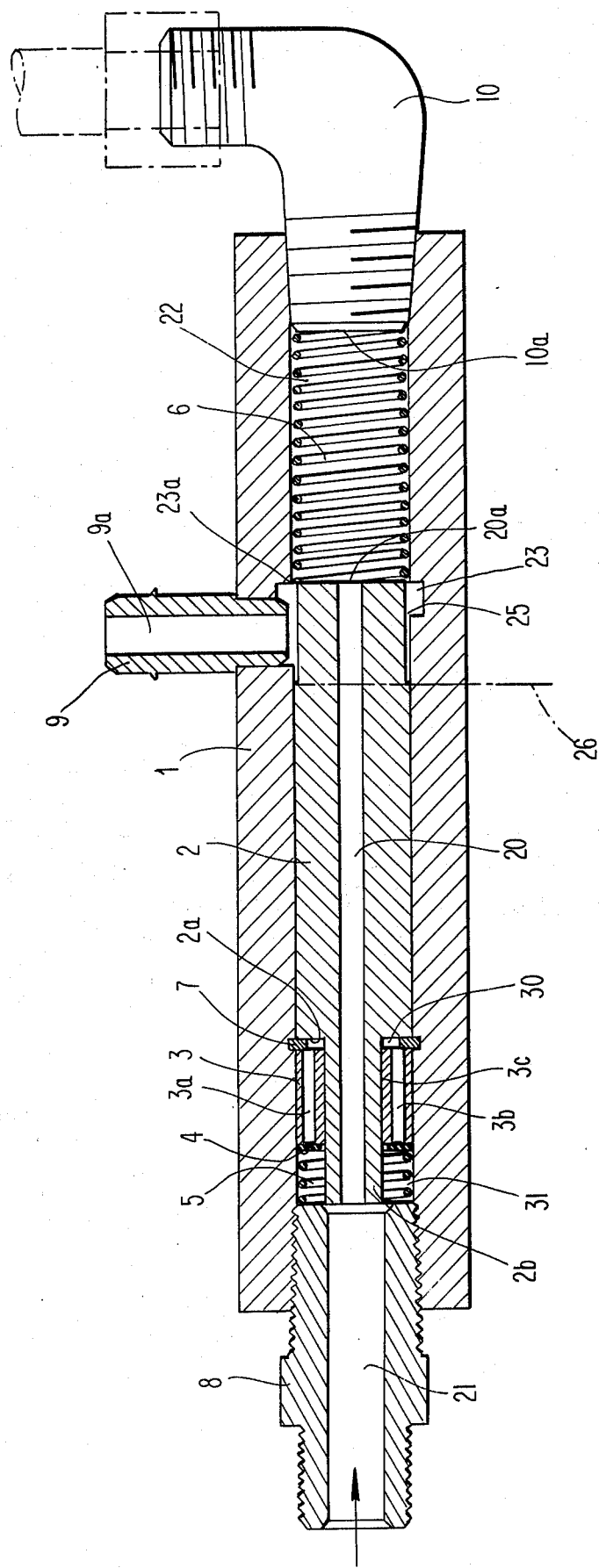

SLOW START HYDRAULIC VALVE

BACKGROUND

The primary object of the present invention is to provide a slow start valve. The valve is intended for use in hydraulic and other fluid-type systems.

The present design is intended to provide a gradual increase in hydraulic flow (and thus hydraulic pressure) upon activation of the pump or other motive means for the hydraulic device in such a manner that the hydraulic fluid does not surge through the system and "hammer" the apparatus.

Although the valve art is relatively highly developed, there is no prior design of which I am aware which accomplishes the slow start function of the present device.

For example, Brooks U.S. Pat. No. 3,604,446 is a fluid valve for a gas turbine engine. The valve does not open until a minimum inlet pressure is reached. At that time, the output valve opens abruptly, so that there is no gradual increase in pressure at the output end of the device. By contrast, the present invention produces such a gradual increase in pressure at the output end of the device. Moreover, Brooks is intended to be operated at a constant pressure, a limitation which the present device is not under.

Another patent which exemplifies the prior art is Slomer U.S. Pat. No. 2,649,688 entitled "Feed Control for Hydraulic Motors". As in the case of the present invention, the Slomer device has as its objective the prevention of so-called hydraulic hammer and the provision of means for the smooth application of hydraulic pressure fluid to hydraulic motors or cylinders. However, the Slomer Patent discloses a hydraulic motor control valve means which in fact is useful only in connection with a main control valve mechanism which is operated by a control handle. In addition, the hydraulic motor feed control of Slomer involves at least three interior valves. As will be seen, the present invention is a much simpler design and accomplishes an improved function compared to the Slomer Patent.

A similarly complicated device shown in Oyster U.S. Pat. No. 2,905,190 for "Hydraulic Shock Damping Apparatus". As in the case of Slomer, the device, which the patentee calls a "pressure responsive control valve" is in fact utilized as an auxillary mechanism in connection with a manually operated open center valve, and is a hybrid mechanism designed for the purpose of reducing hydraulic shock and also to operate as a relief valve. Essentially, this is a shunt type device which, like Slomer, operates only upon an increase in pressure. By contrast, as will be observed from the following description, the present invention has only one moving element and acts upon oil flow alone independent of system pressure.

U.S. Pat. No. 2,609,829 to Davies for "Emergency By-Pass Valve for Fluid Circuits" is an emergency by-pass valve designed for airplane oil systems to return oil to the sump in case of a line rupture. This device requires that the return flow be equal to the input flow in order to operate. By contrast, the slow start device of the present invention does not require return flow for operation.

Chichester U.S. Pat. No. 3,455,322 for "Pressure Compensated Diverter Valve" discloses a relief type valve which does not operate to start movement of a piston gradually. The Chichester device dumps a portion of the input fluid to a relief passage when the pressure in the output passage reaches a certain level and is thus pressure sensitive. The slow start device of the present invention is essentially insensitive to system pressure and operates in response to oil flow and the attendant pressure drop across a single piston.

An older prior art device which illustrates the state of the art is Hipple U.S. Pat. No. 2,888,943 for "Control Valve Having Constant Volume Output Features". This device is manually operated to provide gradual starting of the motor system. The slow start device of the present invention, by contrast, is automatic in its operation.

Gartner U.S. Pat. No. 2,989,975 is a regulator type valve device for maintaining constant pressure drop between upstream and downstream sides of liquid flow under varying rates of flow. The valve dumps or by-passes more fluid with increased system pressure. By-passing a fluid continues when the pressure is maintained constant. In the slow start device of the present invention, bypassing occurs only as flow is initiated and is a transient effect. Thus, under steady-state conditions, no fluid (or an inconsequential amount) is by-passed. In addition, the action of the slow start device of this invention is essentially the same over wide variations in the system pressure.

The foregoing descriptions of the illustrative prior art indicate some of the differences between the present invention and the prior art. Additional differences will be understood from a reading of the following detailed description of one preferred embodiment of the present invention, and from the drawing.

THE DRAWING

The drawing is a sectional view of one preferred embodiment of the slow start valve of the present invention.

ASSEMBLY OF THE PREFERRED EMBODIMENT

As shown in the drawing, the slow start valve of the present invention includes a housing 1, which may be cast iron, having a hollow axial bore in the center in which there is mounted a slidable piston 2. The piston or plunger is the only moving part of the device and preferably is of steel.

To the left of the plunger 2 as viewed in the drawing is a restricter 3 having axial bores 3a and 3b. The restricter 3 is pressed into the housing 1 and remains in the position shown. A rubber washer 4 is urged by means of a compression spring 5 against the ports 3a and 3b of the restricter 3 to maintain the ports normally closed.

At the opposite end of the piston or plunger 2 there is a compression spring 6 which normally maintains the plunger 2 at rest against a retaining ring 7 which is disposed against a shoulder 2a formed by a reduced portion 2b of the piston 2.

An inlet means is provided by a fitting 8 which is secured in the left hand side of the housing 1. Similarly, an outlet pipe 10 is secured at the outlet or right hand end of the casing 1. The fitting 10 is connected to the apparatus, such as a hydraulically operated dental chair (not shown) which is controlled by the device. Similarly, the input of oil or other hydraulic fluid into the fitting 8 is from a sump and pump (not shown) of any standard type. The device also includes a conduit 9 which is fitted in the casing 1 and communicates with the interior thereof in a manner which will be described in more detail. The conduit 9 is connected to the sump and is capable of conveying oil or hydraulic fluid back to the sump under certain conditions which will be described.

The piston 2 includes a central passage 20 which interconnects with a passage 21 in inlet orifice 8. The axial central passage 20 of plunger 2 opens into the interior passage 22 of housing 1 which communicates with the bore 10a of the outlet conduit 10. In addition, the housing 1 is machined in such a manner as to provide an annular groove 23 which communicates with a bore 9a in the conduit 9. It will be observed that the plunger 2 is reduced at its right hand (or outlet) end, as indicated at 25. It will also be observed that the plunger 2 is movable to the right of the position shown in the drawing in the central bore 22 of the housing 1. Upon movement of plunger 2 to the right such that line 26, where the piston is at full diameter, is to the right of shoulder 23a, there is essentially no space to provide a communication between the bore 22, the groove 23 and the bore 9a of conduit 9.

At the left hand portion of the piston, the annular ring 7 is of sufficient size to permit communication between the ports 3a and 3b of restricter 3 and a space 30 which is in fact an annular space around the reduced inlet portion 2b of the plunger 2.

OPERATION

The present device is designed for systems in which there is hydraulic fluid in the system between the pump and the device to be controlled at all times. Thus, while not shown, there would be oil or other suitable hydraulic fluid in the communicating passages 21, 20 and 22, 10a and in the return passage 24 in the sump return conduit 9.

When the pump is started, oil flows into the inlet fitting 8 into passage 21, through passage 20 in plunger 2 and into the annular groove 23 in the housing 1. The oil then passes through passage 9a of conduit 9 and back to the sump.

The aforesaid flow of oil causes a pressure drop on the right hand side of the plunger 2, i.e., so that there is a greater pressure in the chamber 31 between the end of the inlet fitting 8 and the washer 5, than there is in the passage 22 of the outlet side of the device. The pressure differential is a function of the rate of flow of oil and the diameter and length of passage 20. However, the pressure differential remains essentially constant as long as the pump operates and regardless of system pressure. The pressure differential results in a net force urging the piston 2 toward the right against the spring 6.

As plunger 2 begins to move to the right, oil is displaced from cavity 31 into cavity 30. In so doing, the oil passes through very narrow passage between the reduced portion 2b of the plunger 2 and the center hole 3c of restricter 3, as the flow of oil through the ports 3a and 3b of the restricter 3 is blocked by the washer 4. Because the aforesaid passage is so narrow, only a relatively slow flow of oil is necessary to produce enough pressure loss between the chamber 31 and the annular chamber 30 to cause a slow movement of the plunger 2 to the right.

As plunger 2 moves to the right, oil emerging from the orifice 20a of passage 20 of plunger 2 must pass through the narrow annular passageway between the reduced outlet end of plunger 2 and the bore of housing 1, thence through groove 23 and into passageway 9a of conduit 9. Such flow through the narrow opening produces a pressure drop from the chamber 22 to the passageway 9a which increases as the right end of plunger 2 progresses farther to the right of the edge 23a of the groove 23. Thus, the pressure in chamber 22 continues to rise until the shoulder 26 of plunger 2 passes the shoulder 23a of the annular groove 23, at which time the very close sliding fit between plunger 2 and the passageway 22 of housing 1 serves to effectively seal the passageway 22 from the groove 23 and thus from passage 9a of the sump return conduit 9. This causes all of the oil to pass through the central passage 20 of plunger 2 and out through the passageway 22 and the outlet 10a to the device being controlled, which may be a hydraulic piston or other suitable mechanism.

In the fashion described above, the hydraulic piston or other mechanism which is being controlled will begin to move but will not reach full speed until the chamber 22 is fully sealed from the return passage 24. This operation results in a smooth, gradual start of the piston from its rest position. The operation is automatic and effective.

When the pump is stopped, the spring 6 returns the plunger 2 to the left. The oil filling the annular groove 30, rather than passing through the narrow annular opening 3c, goes through the ports 3a and 3b, unseating the valve washer 4 against the very weak force of the spring 5 and entering chamber 31. The oil thus entering the chamber 31 passes through the passage 20 in the piston 2 to fill volume evacuated in chamber 22 by movement of plunger 2 to the left. This action permits the relatively small force of spring 6 to return plunger 2 rapidly to its rest position against retaining ring 7.

The foregoing description illustrates preferred embodiments of my invention. However, the concepts employed may, based upon such description, be employed in other embodiments without departing from the scope of the invention. Accordingly, the following claims are intended to protect the invention broadly, as well as in the specific forms shown herein.

I claim:

1. A slow start hydraulic valve for controlling the flow of hydraulic fluid from a source, including a sump and a pump, to a device to be controlled, comprising
   a. a main housing having an inlet at a first location and an outlet at a second location, a hollow interior chamber connecting said inlet and outlet; said inlet being adapted to receive the hydraulic fluid from the pump and said outlet being adapted to discharge hydraulic fluid to the device to be controlled;
   b. a sump return conduit disposed at a location between said inlet and outlet for returning hydraulic fluid within the hollow chamber to the sump;
   c. a piston disposed in said hollow chamber and having a passage therein connecting said inlet and outlet;
   d. said piston having a main body portion and a first reduced end portion adjacent to the inlet, said first reduced end portion being spaced from the chamber walls, said first reduced portion having a cross-sectional area less than the cross-sectional area of said main body portion;
   e. a spring adjacent said outlet and urging said piston toward said inlet end, said spring having sufficient power to maintain said piston adjacent said inlet when the pump is not operating;

f. a restricter comprising a collar surrounding said first reduced piston portion, said collar having at least one port extending therethrough;

g. closure means for closing off said port in said collar;

h. retaining ring means surrounding said first reduced piston portion disposed to provide a space between the main body portion of the piston and said collar, said space communicating with said port in said collar;

i. said piston including a second reduced end adjacent said outlet; said reduced end having a cross-sectional area less than the cross-sectional area of said main body portion;

j. said housing having a circumferential groove adjacent said sump return conduit to provide a passage from the hollow interior chamber of the housing operable to allow hydraulic fluid to pass back to the sump until the main body portion of the piston closes said passage, Whereby hydraulic fluid pumped into the inlet urges said piston toward said outlet and a portion of the hydraulic fluid passes into the sump return conduit through said groove until the main body portion of the piston passes said groove, whereupon the full flow of the hydraulic fluid passes through the outlet to the device being controlled.

2. A slow start valve comprising a. a casing having an interior main passageway having an inlet end and an outlet end;

b. a slidable piston disposed in said main passageway between said inlet and outlet ends, said piston including a main body portion;

c. conduit means disposed between the inlet and outlet ends for conveying oil or other hydraulic fluid to a sump;

d. a spring means disposed adjacent each end of said piston;

e. said piston having a passage communicating with the inlet end and outlet end, said piston also having a first reduced portion adjacent the outlet end thereof, said reduced portion having a cross-sectional area less than the cross-sectional area of said main body portion thereof;

f. said piston having a second reduced portion adjacent the inlet end thereof, said reduced portion having a cross-sectional area less than the cross-sectional area of said main body portion thereof;

g. a collar comprising a restrictor means surrounding said second reduced portion of said piston, said collar including an axial passage communicating with an open chamber adjacent the inlet end and with a space between the collar and the main body portion of the piston; and an opening between the second reduced portion of the piston and the collar sufficient to gradually allow oil to seep thereabout upon the startup of the device.

* * * * *